United States Patent

[11] 3,628,931

[72] Inventor Robert G. Russell
 Granville, Ohio
[21] Appl. No. 829,631
[22] Filed June 2, 1969
[45] Patented Dec. 21, 1971
[73] Assignee Owens-Corning Fiberglas Corporation

[54] APPARATUS HAVING ROTATING BUSHING FOR FORMING FIBERS
17 Claims, 4 Drawing Figs.

[52] U.S. Cl................................................. 65/11 W,
 18/8 R, 18/8 SR, 65/2, 264/8, 264/176 F
[51] Int. Cl....................................................... C03b 37/02
[50] Field of Search............................................ 264/8, 176
 F; 18/8 R, 8 SR; 65/1, 2, 6, 8, 11, 14, 15, 11 W

[56] References Cited
UNITED STATES PATENTS

| | | | |
|---|---|---|---|
| 2,719,350 | 10/1955 | Slayter et al. | 65/2 UX |
| 3,040,377 | 5/1962 | Slayter et al. | 65/8 |
| 3,525,785 | 8/1970 | Fairbanks | 65/2 X |
| 3,250,602 | 5/1966 | Stalego | 65/11 W X |

Primary Examiner—S. Leon Bashore
Assistant Examiner—Robert L. Lindsay, Jr.
Attorneys—Staelin and Overman and Allen D. Gutchess, Jr.

ABSTRACT: Apparatus is provided for forming fibers from a heat-softenable, filament-forming viscous liquid. A bushing is in the form of a hollow, cylindrical, rotating body having a spirally contoured outer surface, with a right-hand helix at one end and a left-hand helix at the other end, and with inlet openings at an intermediate portion. Means are provided at one end to rotate the bushing and orifices are provided at the other end through which fibers are attenuated. The bushing is located in a liquid-filled chamber, the liquid being fed under pressure by the helixes to the inlet openings where it is forced inwardly and subsequently subdivided into fibers through the orifices. The orifices can be located in a circular pattern to form a hollow cone of fibers attenuated therefrom, with means located below the center of the circular pattern for supplying a coating material to the filaments or for feeding a filamentary core to the center of the collected filaments.

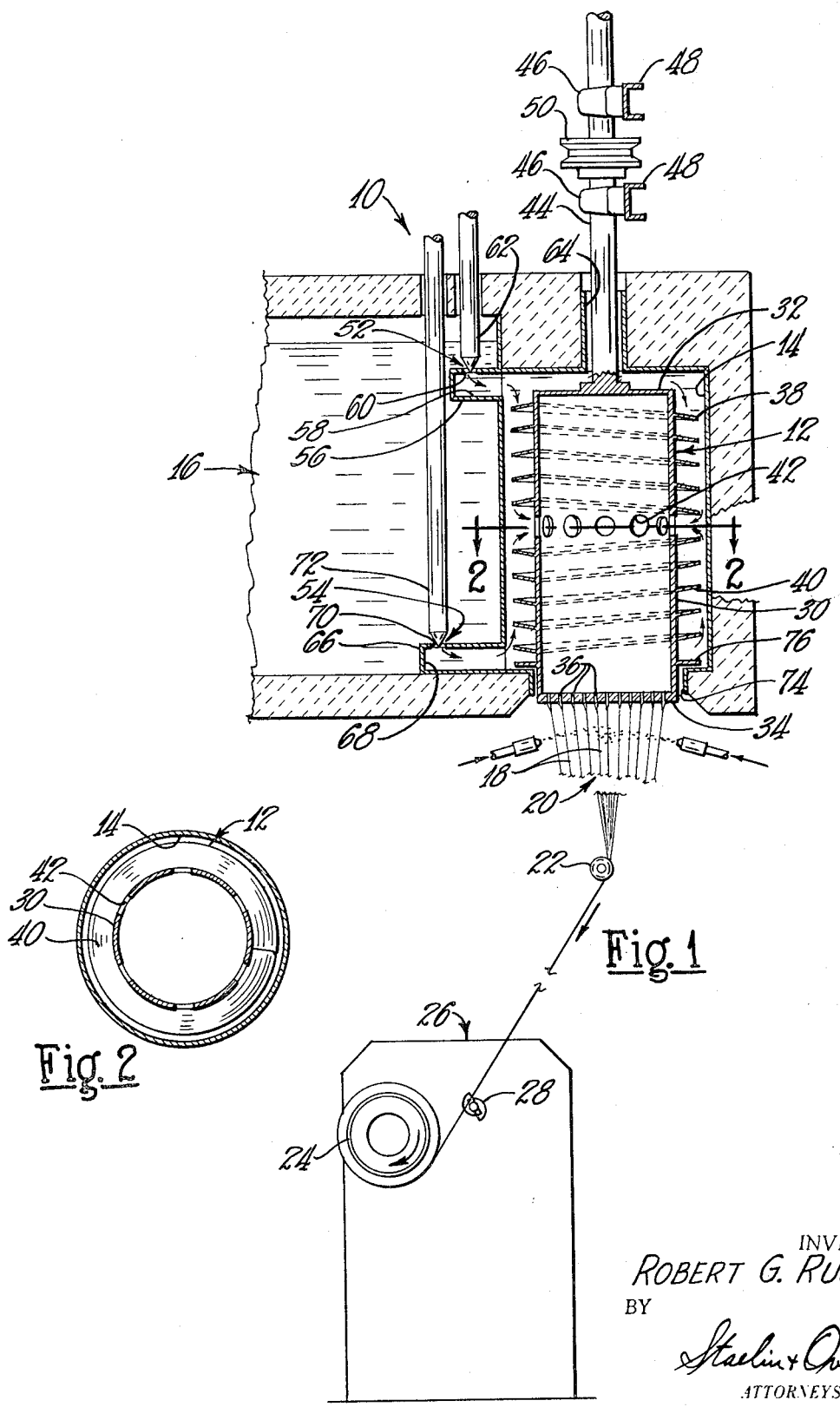

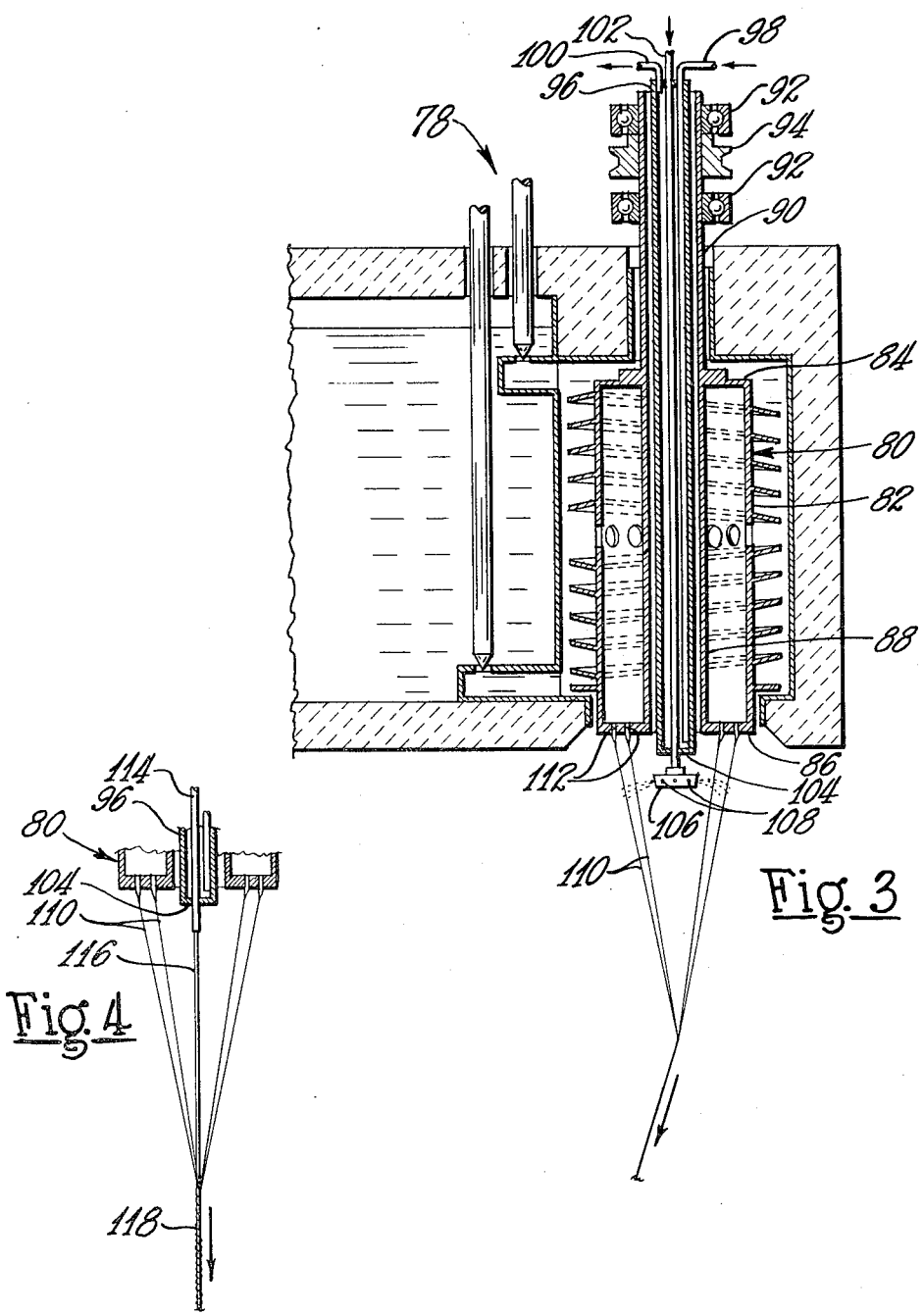

APPARATUS HAVING ROTATING BUSHING FOR FORMING FIBERS

This invention relates to apparatus for handling fluids and more particularly to apparatus for forming fibers from heat-softenable, filament forming, viscous liquid.

In apparatus for forming glass fibers, high temperatures must be employed to render the glass sufficiently fluid to enable the glass to be divided into a multiplicity of streams and attenuated into fibers. Consequently, because of the high temperatures, highly refractory, costly metals have had to be used in the fiber-forming bushing. However, it has been found that if the glass is maintained at a lower temperature, where it is more viscous, it can still be attenuated into fibers if fed through the orifices under pressure. Further, with the lower temperatures, less highly refractory and less expensive metals can be employed.

The present invention relates to unique apparatus for handling liquids and particularly for forming fibers from viscous liquid under pressure. The new apparatus includes a cylindrical bushing having a plurality of intermediate inlet openings peripherally spaced therearound with a multiplicity of orifices preferably located in a circular pattern in a lower end wall of the bushing. Means are provided at the opposite end of the bushing for rotating same. On the outer surface of the bushing are a pair of helical flanges or ridges directed with opposite lead angles so as to force liquid in opposite directions when the bushing is rotated. The bushing is located in a liquid chamber to which liquid is supplied by suitable means and is rotated in a manner such that the liquid at opposite ends of the bushing is forced toward the center and through the peripheral inlet openings to the interior of the bushing. With the circular pattern of the orifices and rotation of the bushing, means can be centrally located below the orifices for supplying liquid coating material of various types to the fibers. In place of the liquid coating applicator, means can be provided, for example, to supply a continuous fibrous or filamentary core of a different nature through the center of the fiber pattern.

It is, therefore, a principal object of the invention to provide improved fiber-forming apparatus having the features and advantages outlined and discussed above.

Other objects and advantages of the invention will be apparent from the following detailed description of preferred embodiments thereof, reference being made to the accompanying drawings, in which:

FIG. 1 is a somewhat schematic, fragmentary view in vertical cross section, with some parts in elevation, of apparatus for forming fibers according to the invention;

FIG. 2 is a view in transverse cross section taken along the line 2—2 of FIG. 1;

FIG. 3 is a cross-sectional view similar to FIG. 1 of modified fiber-forming apparatus; and FIG. 4 is a fragmentary, sectional view of further modified fiber-forming apparatus.

Referring to FIG. 1, apparatus in accordance with the invention for feeding liquid and for forming fibers therefrom is indicated at 10. The apparatus includes a hollow, cylindrical bushing 12 located in a chamber 14 to which molten glass is supplied from a source 16. Filaments 18 are attenuated from the bushing 12 in a fan or cone 20. The filaments 18 are led around an idler or gathering shoe 22 and wound on a collet 24 supported and rotated by a stand 26 and spread along the collet by a level wind device 28, all of which is known in the art.

The bushing 12 includes a cylindrical wall 30, an upper end wall 32, and a lower end wall 34. The lower end wall 34 has a multiplicity of orifices 36 therein which, in this instance, are uniformly spaced over substantially the entire end wall 34. The cylindrical wall 30 of the bushing has an upper helical ridge or flange 38 and a lower helical ridge or flange 40. These extend from points near the ends of the cylindrical wall 30 to points near the middle of the wall 30, terminating near a plurality of circumferentially spaced inlet openings 42.

A central drive shaft 44 is affixed to the upper end wall 32 and extends upwardly above the apparatus 10 to a pair of spaced bearings 46 attached to suitable supports 48. A drive pulley 50 is located between the bearings 46 to rotate the shaft 44 and the bushing 12. When the bushing is rotated in a predetermined direction, glass or other viscous liquid located in the chamber 14 around the bushing 12 is forced by the helical flanges 38 and 40 from end portions of the bushing toward the center and into the inlet openings 42. The flanges 38 and 40 are spaced somewhat from the wall of the chamber 14 so that if pressure of the glass in the bushing 12 becomes excessive, part of the glass can flow back toward the ends of the bushing outside the flanges.

The rate of rotation of the bushing will depend on the output of glass through the orifices 36 and will also vary with the viscosity of the glass. The rate of rotation is controlled so that the rate at which the glass is carried to the openings 42 tends to exceed the rate at which the filaments 18 are attenuated from the end wall 34 with the result that the glass in he bushing 12 is maintained under a constant pressure. This enables the glass to be attenuated through the orifices 36 at a lower temperature than otherwise required and enables the bushing 12 to be made of relatively lower cost metals, rather than the platinum alloys required at higher temperatures. Further, the orifices 36 can be smaller than otherwise, with the result that more can be employed in a given space. Consequently, a given number of filaments can be produced from a smaller bushing and associated apparatus than otherwise required. This enables a reduction in the size of the overall apparatus, resulting in savings in materials and operating expenses, as well as overall space requirements.

The rotating cylindrical wall 30 and the flanges 38 and 40 also significantly aid in mixing the glass as it is carried to the inlet openings 42. This eliminates any chords in the glass and increases homogeneity.

The source 16 of glass or other liquid can be in the form of a tank of the liquid heated by suitable means (not shown). The glass is supplied to the chamber 14 from the source 16 through a pair of flow control devices 52 and 54. The upper flow control device 52 includes an extension 56 of the chamber wall forming a passage 58 and a valve seat 60. An externally adjustable needle valve 62 cooperates with the seat 60 to vary the opening into the passage 58 and, therefore, the flow of glass into the chamber 14. By restricting this flow, a reduced pressure of the glass in the upper part of the chamber 14 is established to eliminate any possibility of glass leaking through a cylindrical upper opening 64 through which the shaft 44 extends. The low pressure is established because the glass in the upper body is carried downwardly by the helical flange 38.

The flow control device 54 also includes an extension 66 of the chamber 14 forming a passage 68 and a valve seat 70. The valve seat 70 cooperates with an externally adjustable needle valve 72 to control flow into the passage 68 from the source 16. A negative pressure of the glass in the lower part of the chamber 14 also can be established by restricting the rate of flow past the needle valve 70. The prevention of leakage of the glass through a lower opening 74 through which the lower extremity of the bushing 12 extends, also is prevented by a circular ring 76 located immediately above the opening 74. The ring 76 rotates with the bushing and forms a dynamic seal by urging outwardly glass adjacent the ring 76 to keep the glass away from the opening 74.

Referring now to FIG. 3, modified apparatus embodying the invention is indicated at 78. This apparatus is basically similar to that of FIG. 1, but modified to employ a central coating applicator. A modified bushing 80 includes a cylindrical side wall 82 with annular end walls 84 and 86 connected by a central inner cylindrical wall 88. A hollow drive shaft 90 extends upwardly from the upper end wall 84, being supported by bearings 92 and driven by a pulley 94.

In accordance with this embodiment of the invention, a tubular sleeve 96 extends downwardly through the hollow drive shaft 90 and the inner cylindrical wall 88 to a point below the lower end wall 86. The sleeve 96 is provided with a coolant supply tube 98 and a coolant outlet line 100 for supplying a suitable coolant to the interior of the sleeve 96. A central coating material supply line 102 extends downwardly through the sleeve 96 to a point below a lower end wall 104 of the sleeve to a spray applicator 106. The spray applicator 106 has a plurality of nozzles 108 therearound which project the coating material outwardly onto two annular rows of filaments 110 attenuated from two annular rows of orifices 112 located in the lower annular end wall 86. With the coolant supplied through the lines 98 and 100, the sleeve 96 is maintained at a lower temperature and can be made of conventional materials. Also, the coating material and its supply line 102 do not reach excessive temperatures.

With this arrangement, the filaments 110 are uniformly coated by the spray applicator 106 as they are attenuated past the spray nozzles 108 and at the same time rotate with the bushing. This provides an efficient and uniform method of coating.

Referring to FIG. 4, a hollow supply member 114 is substituted in the sleeve 96 for the supply line 102 with the supply member extending below the lower end wall 104 of the sleeve and located centrally with respect to the bushing 80. A filamentary core material 116 is fed through the member 114 and is received centrally therebelow in the core of the filaments 110 which are wound in a spiral manner in this instance around the core material 116 which aids in attenuating the filaments 110 as well as constituting a final part of a composite twisted strand 118 formed by the core material 116 and the filaments 110. The filamentary material 116 can be raised to an elevated temperature in the supply member 114 by the heat of the bushing so that it is in a softened state as it exits below the bushing. In this state, it can integrally form with and partially envelop the filaments 110 to provide a unitary composite without further treatment being required.

If desired, a fiber-forming material can be supplied through the line 102 or the member 114. Fibers can then be attenuated from this material through the nozzles or openings 108 and from the end of the supply member 114. In such an instance, heated liquid could be supplied through the lines 98 and 100 to aid in bringing the fiber-forming materials to a proper fiber-forming temperature, if desired.

It will be seen from the above that the fiber-forming apparatus according to the invention has many advantages. The glass or other viscous liquid is thoroughly mixed as it is supplied to the bushing. The bushing is at lower temperatures and can be of relatively low-cost materials as well as being smaller in size. Further, the coating and core arrangements of FIGS. 3 and 4 provide additional advantages for the bushing arrangement of the invention.

Various modifications of the above-described embodiments of the invention will be apparent to those skilled in the art and it is to be understood that such modifications can be made without departing from the scope of the invention, the embodiments shown and described being primarily for purposes of illustration and not limitation.

I claim:

1. Fiber-forming apparatus for feeding a heat-softenable, filament-forming, viscous liquid and for subsequent attenuating the liquid into a multiplicity of fibers, said apparatus comprising a hollow, rotatable body having at least one inlet opening in a wall thereof and a multiplicity of fiber-forming orifices spaced from said inlet opening in a lower portion of said rotatable body, means for rotating said rotatable body, means forming a chamber around said body, means forming a seal between said chamber-forming means and said body at a lower portion of said body above said orifices, means for supplying the liquid to said chamber, means for forcing the liquid in said chamber through said opening into said body to maintain the liquid in said body under pressure to aid in forcing the liquid subsequently through said orifices when said body is rotated, and means for subsequently attenuating into fibers the liquid flowing from said orifices.

2. Apparatus according to claim 1 wherein said inlet opening is located at an intermediate portion of said body wall and said forcing means comprises a pair of helical flanges extending outwardly from the wall of said rotatable body at opposite end portions thereof, said helical flanges having opposite lead angles whereby liquid near the ends of said body is forced toward the intermediate opening in said body as said body is rotated.

3. Apparatus according to claim 1 characterized further by said supply means including means for supplying the liquid to two spaced portions of said chamber near end portions of said rotatable body.

4. Apparatus according to claim 3 characterized by flow control means for controlling the flow of liquid to both of the spaced portions of said chamber.

5. Apparatus according to claim 1 characterized further by said seal comprising a circular outer flange extending from the lower portion of said body and forming a dynamic seal to prevent passage of the liquid around said body and out of said chamber.

6. Apparatus according to claim 1 characterized further by said rotating means comprising said rotatable body having an axially positioned shaft at one end thereof extending through said chamber forming means, and means located outside said chamber for rotating said shaft and said body.

7. Apparatus according to claim 1 characterized further by means extending through said rotatable body and terminating in a coating material applicator beyond said body, said applicator being effective to supply coating material to fibers attenuated from the liquid flowing through said orifices in said body.

8. Apparatus according to claim 1 characterized further by means extending centrally through said hollow body for supplying a filamentary core material centrally through fibers attenuated from said body.

9. Apparatus for controlling and directing a heat-softenable, filament-forming liquid for subsequent subdivision and attenuation into filaments, said apparatus comprising a hollow bushing having a cylindrical wall and a lower end wall, said bushing having an inlet opening in an intermediate portion of said cylindrical wall, means for rotating said bushing, means forming a chamber around said bushing, means for supplying said liquid to said chamber, a plurality of orifices in said lower end wall of said bushing, and means in said chamber located around said bushing for forcing liquid in said chamber toward and through said inlet opening to maintain the liquid in said bushing under pressure to aid the flow of the liquid through said orifices.

10. Apparatus according to claim 9 characterized further by said rotating means comprising a drive shaft affixed to said bushing and extending outside said chamber, and means located outside said chamber for rotating said shaft and said bushing.

11. Apparatus according to claim 9 wherein said liquid forcing means comprises a pair of helical flanges extending outwardly from the bushing at opposite end portions thereof, said helical flanges having opposite lead angles whereby liquid near the ends of said bushing is forced toward the intermediate opening when said bushing is rotated.

12. Apparatus according to claim 9 characterized further by said liquid supply means includes means for supplying the liquid to two spaced portions of said chamber near end portions of said bushing.

13. Apparatus according to claim 12 characterized by flow control means for controlling the flow of liquid to both of the spaced portions of said chamber.

14. Apparatus according to claim 9 characterized further by an end of said bushing having a circular outer flange extending therefrom above said orifices and forming a dynamic seal to prevent passage of the liquid around said bushing and out of said chamber.

15. Apparatus according to claim 9 characterized further by an inner cylindrical wall extending through said bushing and forming a central cylindrical space to receive a central supply member.

16. Apparatus according to claim 15 characterized further by means extending through said inner cylindrical wall of said bushing and terminating in a coating material applicator beyond said bushing, said applicator being effective to supply coating material to filaments rotating around said applicator.

17. Apparatus according to claim 15 characterized further by means extending centrally through said inner cylindrical wall of said bushing for supplying a filamentary core material centrally through a cone of filaments attenuated from said bushing.

* * * * *